(12) United States Patent
Morkovine et al.

(10) Patent No.: US 11,681,572 B2
(45) Date of Patent: Jun. 20, 2023

(54) EXTENSIBLE WORKFLOW ACCESS

(71) Applicant: Box, Inc., Redwood City, CA (US)

(72) Inventors: Daniel Wayne Morkovine, San Carlos, CA (US); Rohit Bakshi, Campbell, CA (US); Faizan N. Buzdar, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 16/726,093

(22) Filed: Dec. 23, 2019

(65) Prior Publication Data

US 2021/0191794 A1    Jun. 24, 2021

(51) Int. Cl.
G06F 9/54      (2006.01)
G06F 9/451     (2018.01)

(52) U.S. Cl.
CPC ............. *G06F 9/547* (2013.01); *G06F 9/451* (2018.02); *G06F 9/541* (2013.01)

(58) Field of Classification Search
CPC .......... G06F 9/4881; G06F 9/505; G06F 9/52; G06F 9/541; G06F 9/542
USPC .................. 718/105, 106, 107; 719/318, 328
See application file for complete search history.

(56) References Cited

U.S. PATENT DOCUMENTS

| | | | |
|---|---|---|---|
| 9,148,425 B2 * | 9/2015 | Rowe | H04L 63/0869 |
| 10,038,731 B2 | 7/2018 | Pearl et al. | |
| 10,176,435 B1 | 1/2019 | Sarkar et al. | |
| 10,331,416 B2 | 6/2019 | Chaudhry et al. | |
| 10,540,624 B2 | 1/2020 | Hui et al. | |
| 10,922,282 B2 | 2/2021 | Jalagam et al. | |
| 2004/0049481 A1 | 3/2004 | Blevins | |
| 2004/0260593 A1 | 12/2004 | Abraham-fuchs et al. | |
| 2006/0074703 A1 | 4/2006 | Bhandarkar et al. | |

(Continued)

FOREIGN PATENT DOCUMENTS

CN        108256788        7/2018

OTHER PUBLICATIONS

Non-Final Office Action for U.S. Appl. No. 16/948,829 dated Sep. 15, 2021.

(Continued)

*Primary Examiner* — Andy Ho
(74) *Attorney, Agent, or Firm* — Vista IP Law Group, LLP

(57) ABSTRACT

Methods, systems and computer program products for extensible content object workflows. A content management system stores a plurality of content objects. The content management system integrates applications, which integrated applications make modifications to the content objects based on computer-aided invocation of workflows. Upon receipt of a message from a first integrated application indicating an intent to invoke a workflow at a second integrated application, the content management system relays information pertaining to the desired workflow to the second integrated application. The workflow of the second integrated application modifies one or more of the content objects or its metadata or other data associated with the workflow. Selection of the second integrated application can be based on attributes of the content objects, and/or can be based on user interactions within a user interface. Interaction events associated with the workflow performed at the second integrated application are relayed back to the originating application.

20 Claims, 12 Drawing Sheets

(56) References Cited

U.S. PATENT DOCUMENTS

| | | |
|---|---|---|
| 2007/0005388 A1 | 1/2007 | Busch et al. |
| 2007/0157210 A1 | 7/2007 | Inoue et al. |
| 2007/0203589 A1 | 8/2007 | Flinn et al. |
| 2007/0265900 A1 | 11/2007 | Moore et al. |
| 2008/0114791 A1 | 5/2008 | Takatsu et al. |
| 2008/0183536 A1 | 7/2008 | Hirabayashi |
| 2009/0172101 A1 | 7/2009 | Arthursson |
| 2009/0249290 A1 | 10/2009 | Jenkins et al. |
| 2011/0004583 A1 | 1/2011 | Honda |
| 2012/0239739 A1 | 9/2012 | Manglik et al. |
| 2012/0290346 A1 | 11/2012 | Breiter et al. |
| 2013/0275475 A1 | 10/2013 | Ahlborn |
| 2015/0067028 A1* | 3/2015 | Kumar ............... G06F 9/5038 709/203 |
| 2015/0082271 A1 | 3/2015 | Damonte et al. |
| 2015/0088924 A1 | 3/2015 | Abadi et al. |
| 2015/0149535 A1 | 5/2015 | Howard |
| 2017/0048285 A1 | 2/2017 | Pearl et al. |
| 2017/0068915 A1 | 3/2017 | Nair |
| 2017/0168765 A1 | 6/2017 | Fan et al. |
| 2017/0264567 A1 | 9/2017 | Shetty et al. |
| 2017/0316363 A1 | 11/2017 | Siciliano et al. |
| 2019/0026663 A1 | 1/2019 | Homeyer et al. |
| 2019/0332695 A1 | 10/2019 | Bensberg et al. |
| 2020/0050330 A1 | 2/2020 | Schilling et al. |
| 2020/0065152 A1 | 2/2020 | Parmar et al. |
| 2020/0065313 A1 | 2/2020 | Patel et al. |
| 2020/0301674 A1 | 9/2020 | Swope et al. |
| 2020/0380432 A1 | 12/2020 | Wang et al. |
| 2020/0389543 A1 | 12/2020 | Swope et al. |
| 2021/0004273 A1* | 1/2021 | You ....................... G06F 9/5066 |
| 2022/0083679 A1 | 3/2022 | Hiller et al. |

OTHER PUBLICATIONS

Geisriegler, "Actor Based Business Process Modeling and Execution: a Reference Implementation Based on Ontology Models and Microservices," 2017 43rd Euromicro Conference on Software Engineering and Advanced Applications (S EAA) , pp. 359-362 (Year: 2017).

Koschmider, "Recommendation-based editor for business process modeling," 2011, Data & Knowledge Engineering, vol. 70, pp. 483-503 (Year: 2011).

"SharePoint 2013 Workflow—Dynamic Values", AndrewConnell, dated Jul. 17, 2012, URL: https://www.andrewconnell.com/blog/SP2013-Workflow-Dynamic-Values/.

"Workflow Variable Datatype Conversion", Informatica, dated Apr. 15, 2019, URL: https://docs.informatica.com/data-integration/data-services/10-2/developer-workflow-guide/workflow-variables/workflow-variable-datatype-conversion.html.

"Creating Dynamic Variable Types", UIPath Forum, dated Aug. 2019, URL: https://forum.uipath.com/t/creating-dynamic-variable-types/141077.

"Developing Web Views for VMware vCenter Orchestrator", vRealize Orchestrator 5.5, vmware, copyright 2017.

"VMware vCenter Orchestrator 5.5 Release Notes", Vmware, dated Jun. 26, 2017.

"Developing with Vmware vCenter Orchestrator," vRealize Orchestrator 5.5.1, copyright 2014.

"Developing a Web Services Client for VMware vCenter Orchestrator," vRealize Orchestrator 5.5.1, copyright 2014.

"VMware vCenter Orchestrator 5.5.1 Release Notes", vmware, dated Jun. 23, 2017.

"Using the Vmware vCenter Orchestrator Client," vRealize Orchestrator 5.5.1, Copyright 2014.

"Installing and Configuring Vmware vCenter Orchestrator," vRealize Orchestrator 5.5.2, Copyright 2014.

"VMware vCenter Orchestrator 5.5.2 Release Notes," vmware, dated Jun. 16, 2017.

"Using VMware vCenter Orchestrator Plug-Ins," vRealize Orchestrator 5.5.2, Copyright 2014.

"VMware vCenter Orchestrator 5.5.3 Release Notes," vmware, dated Jun. 23, 2017.

"VMware vCenter Orchestrator 5.5.2.1 Release Notes," vmware, dated Jun. 16, 2017.

"ProcessMaker Advanced Workflow for DocuSign," DocuSign, date obtained via Google as 2018, URL: https://partners.docusign.com/s/partner-solution/aNR1W000000001I/processmaker-advanced-workflow-for-docusign-esignature.

"DocuSign Electronic Signature Workflow," ProcessMaker, date obtained via Google as Dec. 5, 2016, URL: https://www.processmaker.com/landing/processmaker-docusign/.

Glatard, T., et al. "Software architectures to integrate workflow engines in science gateways," Future Generation Computer Systems vol. 75, Oct. 2017, pp. 239-255.

"Data Object Classes," copyright 2013, DNAnexus, Inc.

"Metadata API Developer Guide," SalesForce, Version 46.0, dated 2019.

"Cúram Workflow Reference Guide," Version 6.0.4, Copyright 2011, Cúram Software Limited.

"Developer Tutorials/Workflow Build Process," copyright 2013, DNAnexus, Inc.

"IBM Case Manager target object store extensions," IBM Corporation, Copyright 2016.

Vardigan, M., et al., "Creating Rich, Structured Metadata: Lessons Learned in the Metadata Portal Project," IASSIST Quarterly, dated 2014.

"User Guide," Informatica® Test Data Management 10.2.1, dated May 2018.

"Do more with Dropbox using your favorite tools," Dropbox, date found via Internet Archive as Mar. 8, 2021, URL: https://www.dropbox.com/features/extensions.

"Build better campaigns with Dropbox for Salesforce Marketing Cloud," Dropbox Team, dated Jun. 17, 2019, URL: https://blog.dropbox.com/topics/product-tips/dropbox-marketing-cloud.

English Translation of CN-108256788-A, translated on Sep. 28, 2021 (original reference published on Jul. 6, 2018).

Non-Final Office Action for U.S. Appl. No. 16/726,081 dated Oct. 4, 2021.

Final Office Action for U.S. Appl. No. 16/948,829 dated Mar. 1, 2022.

Non-Final Office Action dated Apr. 20, 2021 for related U.S. Appl. No. 16/553,144.

Bellini, et al. A Workflow Model and Architecture for Content and Metadata Management Based on Grid Computing. ECLAP 2013, pp. 118-127. (Year: 2013).

Belhajjame et al. Metadata Management in the Taverna Workflow System. IEEE International Symposium on Cluster Computing and the Grid, 2008, pp. 651-656. (Year: 2008).

Final Office Action dated Aug. 31, 2021 for related U.S. Appl. No. 16/553,144.

Glatard, T. et al., "Software architectures to integrate workflow engines in science gateways", Future Generation Computer Systems, vol. 75, (Oct. 2017).

Duranova, E. "Data Object Classes", DNAnexus, (last edited on Oct. 4, 2018).

"Informatica® Test Data Management 10.2.1", User Guide, (May 2018).

Zalcman, A. "Developer Tutorials/Workflow Build Process", DNAnexus, (last edited on Oct. 4, 2018).

Salesforce, "Metadata API Developer Guide", Version 46.0, Summer'19, (Last updated: May 22, 2019).

IBM Cúram Social Program Management, Curam Workflow Reference Guide, Version 6.0.4 (Year: 2012).

Non-Final Office Action dated Nov. 8, 2021 for realated U.S. Appl. No. 16/553,161.

Vardigan, Mary, et al. "Creating Rich, Structured Metadata: Lessons Learned in the Metadata Portal Project." IASSIST Quarterly 38.3 (2015): 15-15.

Jensen et al. Using Characteristics of Computational Science Schemas for Workflow Metadata Management. IEEE Congress on Services 2008—Part I, pp. 445-452. (Year: 2008).

(56) References Cited

OTHER PUBLICATIONS

Non-Final Office Action for U.S. Appl. No. 16/553,144 dated Mar. 10, 2022.
Final Office Action for U.S. Appl. No. 16/553,161 dated Mar. 21, 2022.
Final Office Action for U.S. Appl. No. 16/726,081 dated Apr. 14, 2022.
Final Office Action For U.S. Appl. No. 16/553,144 dated Aug. 5, 2022.
Non-Final Office Action for U.S. Appl. No. 16/726,081 dated Aug. 5, 2022.
Non-Final Office Action for U.S. Appl. No. 16/553,161 dated Aug. 15, 2022.
Notice of Allowance dated Sep. 21, 2022 for U.S. Appl. No. 17/447,562.
Final Office Action for U.S. Appl. No. 16/553,161 dated Jan. 24, 2023.
Notice of Allowance for U.S. Appl. No. 16/726,081 dated Jan. 26, 2023.
Non-Final Office Action dated Feb. 17, 2023 for U.S. Appl. No. 16/553,144.
Non-Final Office Action dated Feb. 28, 2023 for U.S. Appl. No. 16/948,829.

* cited by examiner

EXTENSIBLE WORKFLOW ACCESS

FIELD

This disclosure relates to shared content management systems, and more particularly to techniques for providing access to dynamically extensible workflows.

BACKGROUND

The high-performance computing, storage, and networking capabilities characteristic of today's computing environments have impacted the way personal and corporate computer-readable content objects (e.g., documents, spreadsheets, images, programming code files, etc.) are created, stored, and shared. The capabilities of these environments facilitate interactions (e.g., authoring, editing, viewing, etc.) that are performed over content objects by trusted users (e.g., collaborators) on a variety of user devices such as mobile phones, tablets, laptop computers, desktop computers, and/or other devices. In many cases, commonly-occurring interactions over the content objects are organized into automated workflows. Such workflows often specify an ordered sequence or "flow" of operations to be performed on the content objects, which operations are often invoked by user interactions with the content objects. Interactions with a particular content object may be performed by one user, multiple users, and/or even autonomously by one or more computing entities (e.g., processes, agents, applications, etc.). Moreover, such interactions may span across multiple projects, and/or multiple departments, and/or multiple enterprises.

Modern computing environments facilitate the proliferation and use of numerous applications that are accessed by the users to carry out the foregoing interactions and/or workflows over content objects. These applications (e.g., application-specific tools, point tools, etc.) are often used to improve the efficiency of the interactions performed over the content objects. A particular application may be selected from many hundreds of applications available in a computing environment for a variety of reasons such as: (1) the familiarity and/or proficiency of users with the application, (2) the popularity and/or (3) the functionality of the application as pertains to a particular content object type and/or a particular interaction (e.g., operation) over that content object type, and/or (4) for other reasons.

To extend the number and types of workflows that can be performed over content objects, certain applications may establish direct integrations with one another. Consider, for example, a first application that establishes a direct integration with a second application. This integration may include registration of the second application with the first application, establishment of APIs to facilitate communication between the applications, and other integration inter-application features. Once established, the integration might facilitate invoking, from the first application, a workflow that is performed in whole or in part by the second application.

Unfortunately, the foregoing direct integration approach limits the workflows available to a particular application to merely those workflows native to the first application and to those workflows facilitated by other applications directly integrated with that particular application. This is too limiting. Moreover, with the foregoing approach, the number of integrations required to achieve 100% workflow access over all applications grows exponentially with the number of integrations. More specifically, the number of integrations required to achieve 100% workflow access (i.e., "from any" and "to any") for N applications is $N^2-N$. Thus, as N increases, the number of integrations explodes. What is needed is way to integrate many content object workflows while avoiding the explosion of the number of integrations between the applications.

SUMMARY

The present disclosure describes techniques used in systems, methods, and in computer program products for extensible workflow access, which techniques advance the relevant technologies to address technological issues with legacy approaches. More specifically, the present disclosure describes techniques used in systems, methods, and in computer program products for accessing a dynamically extensible set of content object workflows. Certain embodiments are directed to technological solutions for accessing a dynamically extensible set of applications through a content management system to perform workflows over content objects managed by the system.

The disclosed embodiments modify and improve over legacy approaches. In particular, the herein-disclosed techniques provide technical solutions that address the technical problems attendant to content object workflows being limited to those performed at locally integrated applications. Such technical solutions involve specific implementations (i.e., data organization, data communication paths, module-to-module interrelationships, etc.) that relate to the software arts for improving computer functionality.

The ordered combination of steps of the embodiments serve to reduce the number and extent of integrations that need to be developed to accomplish remote application workflow invocation. Specifically, the disclosed techniques for accessing a dynamically extensible set of applications through a content management system rather than directly from a subject application serve to overcome long-standing yet heretofore unsolved technological problems associated with content object workflows being limited to only those workflows performed at locally integrated applications.

Many of the herein-disclosed embodiments for accessing a dynamically extensible set of applications through a content management system to perform workflows over content objects managed by the system are technological solutions pertaining to technological problems that arise in the hardware and software arts that underlie shared content management systems. Aspects of the present disclosure achieve performance and other improvements in peripheral technical fields as well, including (but not limited to) improvements pertaining to dynamically-populated user interfaces and improvements to technological mechanisms that facilitate webapp interoperation.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
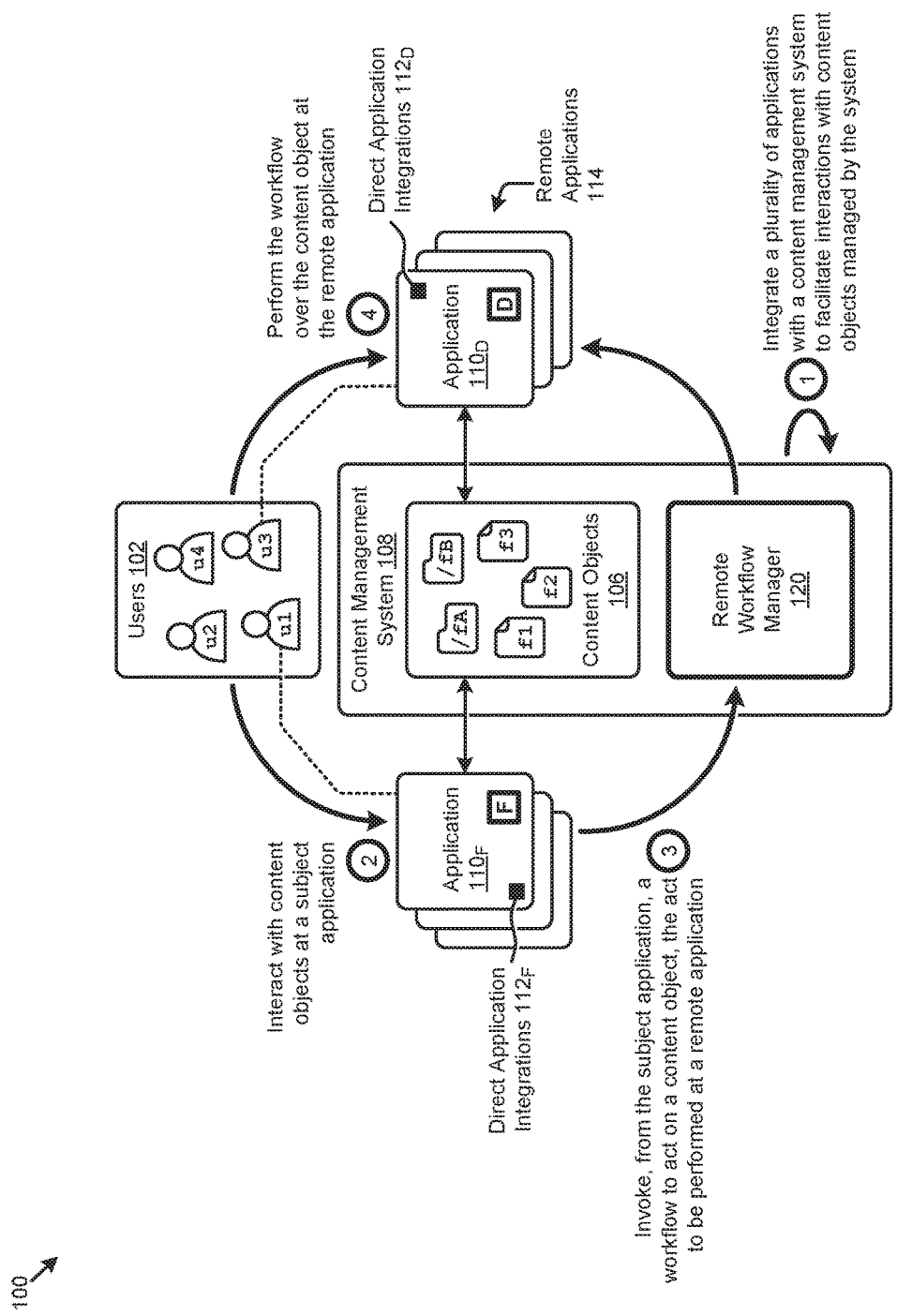
FIG. 1A and FIG. 1B illustrate a computing environment in which embodiments of the present disclosure can be implemented.

Aspects of the present disclosure solve problems associated with content object workflows being limited only to those performed at or by locally integrated applications. These problems are unique to, and may have been created by, various computer-implemented methods for interoperation between Internet-enabled applications. Some embodiments are directed to approaches for accessing a dynamically extensible set of applications through a content management system to perform workflows over content objects managed by the content management system. The accompanying figures and discussions herein present example environments, systems, methods, and computer program products for accessing a dynamically extensible set of content object workflows.

Overview

Disclosed herein are techniques for accessing an extensible set of applications through a content management system to perform workflows over content objects that are managed by the content management system. In certain embodiments, the techniques are implemented in a computing environment comprising a content management system that facilitates interactions over a plurality of content objects that are created by, or modified by, or accessed by, a plurality of applications that implement workflows. The applications available in the computing environment can include native applications (e.g., web apps, mobile applications, etc.) that are provided by the content management system as well as third-party applications that are available in the overall computing environment. Such third-party applications are applications that are not provided and/or maintained by the provider of the content management system but, rather, are applications that are integrated with the content management system to facilitate certain interactions with at least some of the types of content objects managed at the content management system.

When a user interacts (e.g., either via a native application or a third-party application) with a subject content object at a subject application that is integrated with the content management system, a set of workflows that are applicable to the subject content object are presented to the user. The presented workflows comprise an extensible set of workflows that correspond to a respective extensible set of remote applications that are integrated with the content management system. As used herein a workflow can be a single, atomic workflow that is carried out solely by a single application, or a workflow can be a compound workflow that is composed of a first portion of a workflow that is carried out by a first application and a second portion of the workflow that is carried out by a second application such that the performance of the compound workflow as a whole serves to accomplish a particular result.

Applications are deemed to be "remote applications" with respect to the subject application in that the remote applications are not integrated directly with the subject application. Rather, the remote applications and/or the workflows of the remote applications are accessible only through the content management system. Specifically, via a user interface at a subject application, a user can merely identify a remote application's workflow. The content management system will in turn invoke the particular identified workflow to be performed by the corresponding remote application.

In certain embodiments, during performance of a workflow of one or more remote applications, the content management system observes and records the interaction activity raised by the remote applications. In some embodiments, certain information associated with the interaction activity at a given remote application is published to the subject application. In certain embodiments, users interact with a user interface to view, identify, and/or invoke workflows associated with the remote applications. In certain embodiments, a subject application can receive a dynamically augmented set of workflows of remote applications.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

Figure 1B:
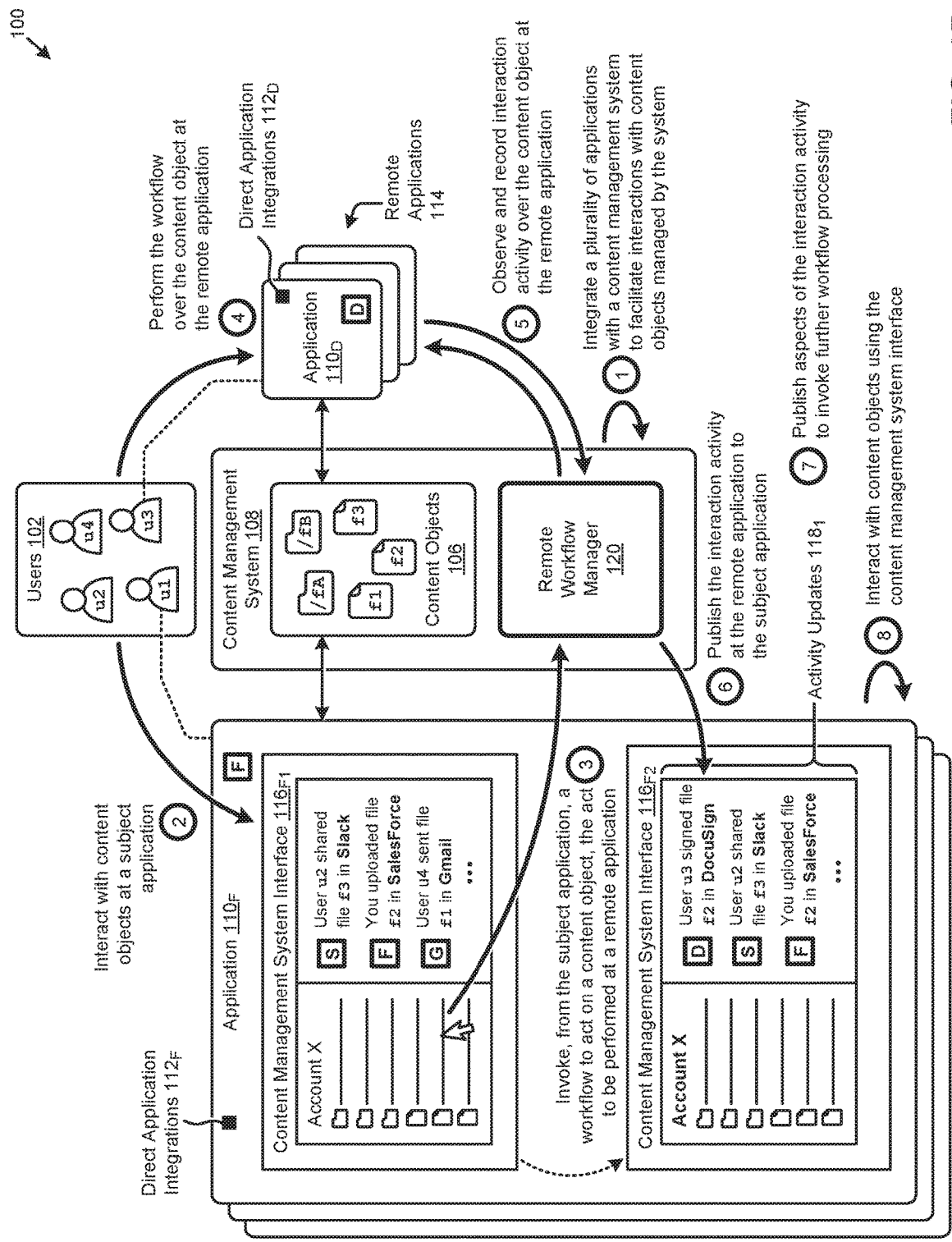

FIG. 1A and FIG. 1B illustrate a computing environment 100 in which embodiments of the present disclosure can be implemented. As an option, one or more variations of computing environment 100 or any aspect thereof may be implemented in the context of the architecture and functionality of the embodiments described herein.

FIG. 1A and FIG. 1B illustrate aspects pertaining to accessing a dynamically extensible set of applications through a content management system to perform workflows over content objects managed by the system. Specifically, FIG. 1A presents a logical depiction of how the herein disclosed techniques are used to interact with a plurality of remote applications integrated with the content management system to perform a selection of extensible workflows over content objects managed by the system. FIG. 1B presents further details of how the herein disclosed techniques are used to capture the interaction activity at the remote applications (e.g., during performance of the workflows) and publish the activity to a subject application or applications. Representative sets of high order operations are also presented to illustrate how the herein disclosed techniques might be applied in computing environment 100.

The logical depiction of FIG. 1A depicts a representative set of users 102 (e.g., user "u1", user "u2", user "u3", and user "u4") who desire to interact with various instances of content objects 106 (e.g., folder "fA", folder "fB", file "f1", file "f2", and file "f3") managed at a content management system 108. Users 102 may be users of content management system 108, which facilitates interactions (e.g., authoring, editing, viewing, etc.) by the users over content objects 106 for sharing, collaboration, and/or other purposes. In some cases, such interactions are organized into workflows. Interactions and/or workflows over a particular content object may be performed by one or more of users 102 and/or even autonomously by one or more computing entities (e.g., processes, agents, applications, etc.).

In computing environment 100, the interactions and/or workflows executed over content objects 106 by users 102 are facilitated by various applications (e.g., application $110_F$, application $110_D$, etc.). These applications (e.g., web apps, mobile applications, etc.) can include native applications that are provided by content management system 108 as well as third-party applications that are available in the overall computing environment. Such third-party applications are applications that are not provided and/or maintained by the provider of content management system 108.

Certain applications often establish direct integration with one or more other applications to extend the number and types of workflows that can be performed over content objects 106. Consider, for example, that application $110_F$ establishes a direct integration with a second application. Such integration may include registration of the second application with application $110_F$, establishment of APIs to facilitate communication between the applications, and other inter-application integration features. Once established, the integration might facilitate invoking, from application $110_F$, a workflow that is performed in whole or in part by the second application.

As earlier mentioned, however, the foregoing direct integration approach limits the workflows available to a particular application to merely those workflows native to that application and to those workflows facilitated by other applications locally integrated with that particular application. With this approach, the number of direct or local integrations required to achieve 100% workflow access over all applications in computing environment 100 grows exponentially with the number of applications. More specifically, if there are N applications in computing environment 100, then application $110_F$ and application $110_D$ and all other applications would each need N−1 direct integrations (e.g., direct application integrations 112F, direct application integrations 112, etc.) to achieve 100% workflow access. In this case, over all N applications, there will be $N^2 − N$ total direct integrations in computing environment 100. A more appropriate architecture, as disclosed herein, would scale to require on the order of only 2N integrations to achieve 100% workflow access over all applications.

The herein disclosed techniques address such challenges pertaining to content object workflows being limited to those performed directly at integrated applications. Specifically, the herein disclosed techniques address such challenges at least in part by using the content management system 108 as a common repository of workflows and/or to relay workflow invocation requests. As used herein, a remote application is an application that has no direct or local integration with a subject application. With this approach, content management system 108 serves as an intermediary that facilitates a one-to-many relationship between a subject application (e.g., application $110_F$) and multiple instances of remote applications 114 (e.g., application $110_D$ and/or other applications). In the embodiment of FIG. 1A, a remote workflow manager 120 is implemented at content management system 108 to facilitate the foregoing intermediation capability and/or other capabilities.

As such, rather than N applications in computing environment 100 having to establish $N^2−N$ direct integrations with one another to achieve 100% workflow access, full access can be achieved by N integrations between content management system 108 and each respective application (operation 1). The foregoing application integrations with content management system 108 enable the users 102 to interact with content objects 106 at any of the applications (operation 2). As facilitated by the herein disclosed techniques, the users can invoke, from any subject application, workflows to be performed over the content objects at any of the remote applications 114 (operation 3). Remote workflow manager 120 receives such workflow requests and forwards them to respective target remote applications to facilitate performance of the corresponding workflows over the content objects (operation 4). As merely one example, user "u1" might interact with a contract (e.g., file "f2") at a SalesForce application (e.g., application $110_F$). From the SalesForce application, user "u1" invokes a signature workflow over the contract to be performed at a DocuSign application (e.g., application $110_D$). In this case, the signature workflow might request user "u3" to interact with the DocuSign application to sign the contract.

In some cases, users who are interacting with a particular subject application desire to know the interaction activities and/or events that occur at remote applications 114. Referring to the embodiment of FIG. 1B, a content management system interface $116_{F1}$ is presented at application $110_F$. As can be observed, the interface displays a list of content objects from content objects 106 that are associated with "Account X". Content management system interface $116_{F1}$ also shows a then-current stream of activity associated with the list of content objects. The activity stream indicates the application (e.g., application "S", application "F", application "G", etc.) where the activity occurred, a summary of the activity that includes a user identifier, a content object identifier, an application identifier, and other information.

As with the scenario of FIG. 1A, the applications of computing environment 100 are each integrated with content management system 108 (operation 1) to facilitate interactions with content objects 106 at the applications. In the scenario of FIG. 1B, a user "u1" interacts with content management system interface $116_{F1}$ at application $110_F$ (e.g., the subject application) to invoke a workflow (operation 3) at application $110_D$ (e.g., the remote application). In this case, when the workflow is performed (operation 4), the interaction activity over the content object is observed and recorded (operation 5). As an example, remote workflow manager 120 at content management system 108 might receive a workflow request from the subject application, invoke the workflow at a remote application, and monitor and record the interaction activity at the remote application. As shown, the interaction activity is published by remote workflow manager 120 to the application that originated the workflow (operation 6) request. The interaction activity may be published to other applications as well.

In some cases, such interaction activity is manifested in a set of activity updates $118_1$ that are display in content management system interface $116_{F2}$. Specifically, a new update (e.g., "User u3 signed file f2 in DocuSign") is published as an activity update. The user can then choose to interact with content objects of the content management system through the user interfaces of the application that originated the workflow request (operation 7).

One embodiment of the foregoing techniques for extensible content object workflow access is disclosed in further detail as follows.

Figure 2:
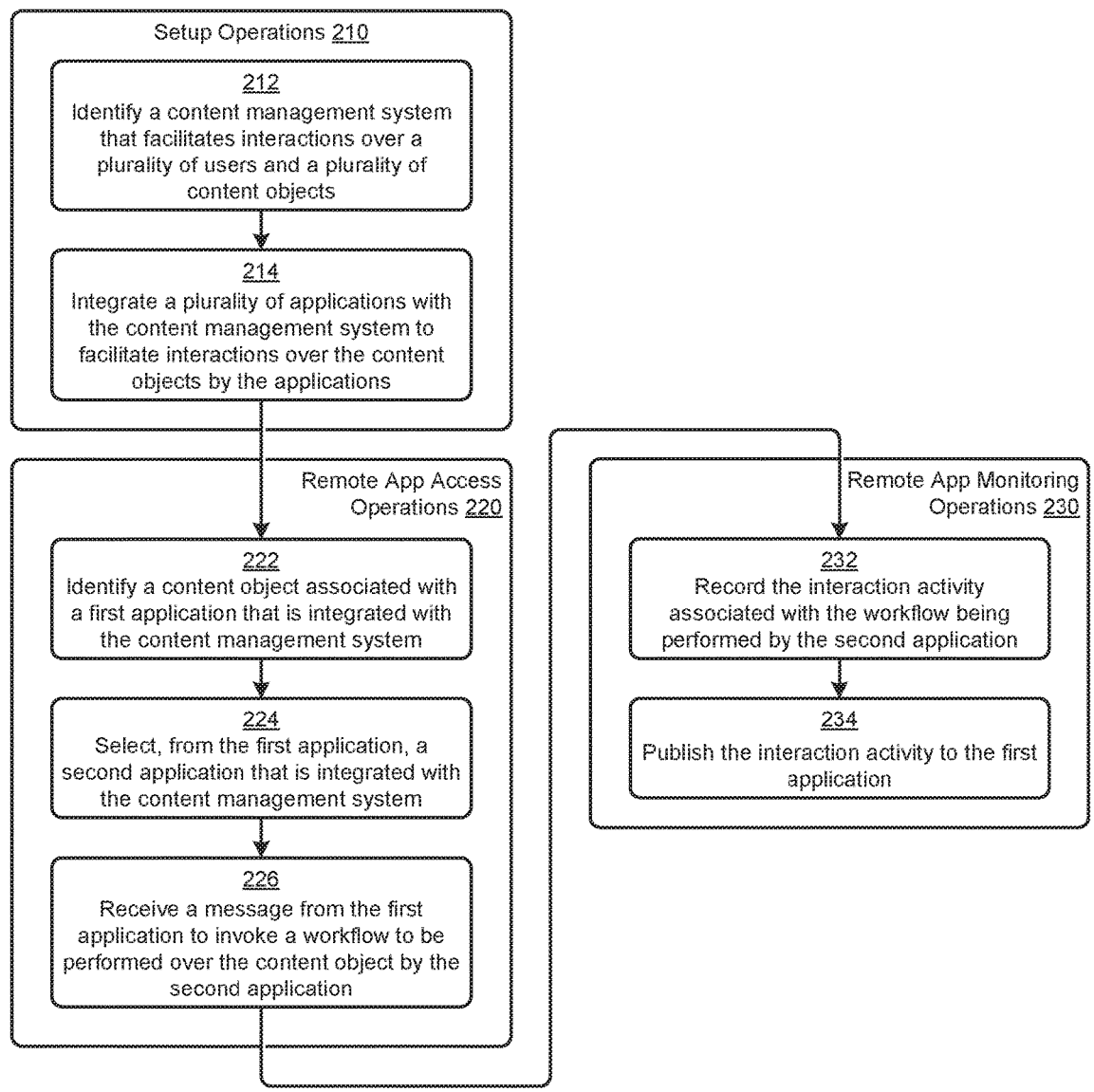
FIG. 2 depicts an extensible content object workflow access technique as implemented in systems that facilitate use of a dynamically extensible set of content object workflows, according to an embodiment.

FIG. 2 depicts an extensible content object workflow access technique 200 as implemented in systems that facilitate use of a dynamically extensible set of content object workflows. As an option, one or more variations of extensible content object workflow access technique 200 or any aspect thereof may be implemented in the context of the architecture and functionality of the embodiments described herein. The extensible content object workflow access technique 200 or any aspect thereof may be implemented in any environment. As used herein, the terms "extensible workflow", or "extensible workflow access", or "extensible content object workflow" refer to mechanisms for integrating additional content object processing through the content management system in a manner facilitates user invocation of a remote application from a subject application without requiring the subject application to have a direct integration with the remote application or its workflows.

FIG. 2 illustrates aspects pertaining to accessing a dynamically extensible set of applications through a content management system to perform workflows over content objects managed by the system. Specifically, the figure is presented to illustrate one embodiment of certain steps and/or operations performed over a network of devices (e.g., user devices, computing systems, etc.) to invoke and execute workflows at an extensible set of remote applications, and to monitor, record, and publish the interaction activities at those remote applications. As can be observed, the steps and/or operations can be grouped into a set of setup operations 210, a set of remote app access operations 220, and a set of remote app monitoring operations 230.

Setup operations 210 of extensible content object workflow access technique 200 commences by identifying a content management system that facilitates interactions over a plurality of users and a plurality of content objects (step 212). Such interactions can involve both user-to-user interactions and user-to-content interactions. One or more applications (e.g., apps) are integrated with the content management system to facilitate interactions over the users and/or content objects performed at the apps (step 214). As an example, a sales contract document managed by the content management system might be shared using a first application (e.g., SalesForce) to facilitate the development of the contract after which, the contract might be submitted to a second application (e.g., DocuSign) to facilitate execution (e.g., signing) of the contract. In this case, the SalesForce and DocuSign applications might be registered with the content management system to facilitate authorized access to the sales contract document managed (e.g., stored, updated, etc.) at the content management system. The herein disclosed techniques further facilitate invoking the workflow at the second application from the first application, as described in the following.

Specifically, according to remote app access operations 220, a content object that is associated with a first application integrated with the content management system is identified (step 222). According to the foregoing example, the identified content object is the sales contract associated with the SalesForce application. A second application (e.g., remote application) that is integrated with the content management system is selected (step 224). The selected application often has some association with the subject content object, such as being suitable for performing certain workflows over the content object. In the foregoing example, DocuSign is the second application. An indication (e.g., message or API call) from the first application to invoke a workflow at the second application is received (step 226). For example, a message or API call received from the SaleForce application might be processed by the content management system to invoke a workflow at the DocuSign application.

According to remote app monitoring operations 230, the interaction activity associated with the workflow being performed at the second application is recorded (step 232). As merely one example, the interaction activity recorded might pertain to a signature event in the DocuSign application. The interaction activity is then published to the first application and/or any other selected applications (step 234). In some cases, the interaction activity might be presented in a human-readable form in an application whereas, in other cases, the interaction activity might comprise information (e.g., status flags) that is collected in one or more native data structures of the application.

One embodiment of a system, data flows and data structures for implementing the extensible content object workflow access technique 200 and/or other herein disclosed techniques is disclosed as follows.

Figure 3:
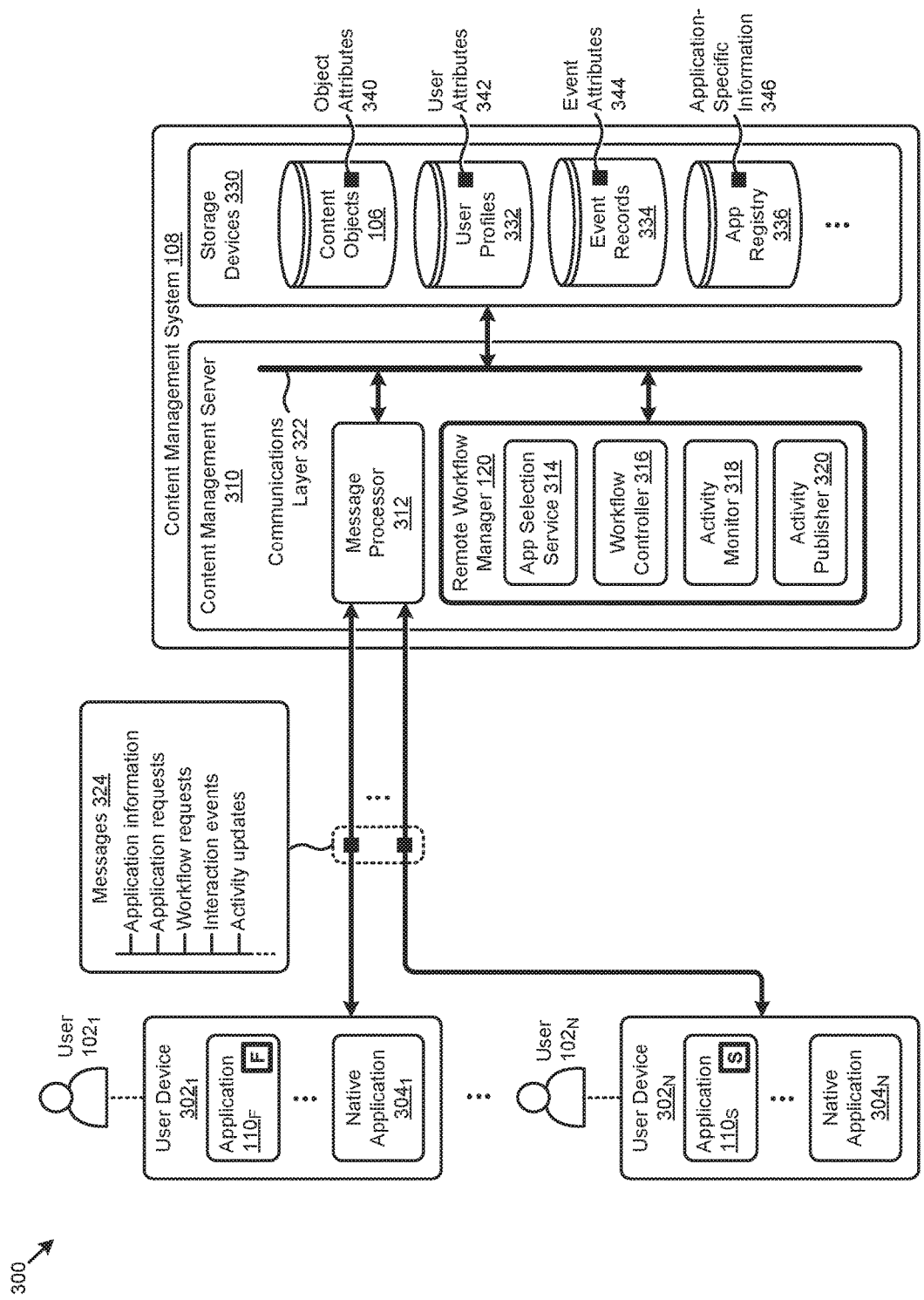
FIG. 3 is a block diagram of a system that implements dynamically extensible content object workflows, according to an embodiment.

FIG. 3 is a block diagram of a system 300 that implements dynamically extensible content object workflows. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to accessing a dynamically extensible set of applications through a content management system to perform workflows over content objects managed by the system. Specifically, the figure is being presented to show one embodiment of certain representative components and associated data structures and data flows implemented in a computing environment to facilitate the herein disclosed techniques. As shown, the components, data flows, and data structures are associated with a set of users that interact with each other (e.g., user $102_1$, ..., user $102_N$) and a set of content objects 106 managed at a content management system 108. The components, data flows, and data structures shown in FIG. 3 present one partitioning and associated data manipulation approach. The specific example shown is purely exemplary, and other subsystems, data structures, and/or partitionings are reasonable.

As shown, system 300 comprises an instance of content management server 310 operating at content management system 108. Content management server 310 comprises a message processor 312 and an instance of a remote workflow manager 120, which comprises an app selection service 314, a workflow controller 316, an activity monitor 318, and an activity publisher 320. A plurality of instances of the foregoing components might operate at a plurality of instances of servers (e.g., content management server 310) at content management system 108 and/or any portion of system 300. Such instances can interact with a communications layer 322 to access each other and/or a set of storage devices 330 that store various information to support the operation of components of system 300 and/or any implementations of the herein disclosed techniques.

For example, the servers and/or storage devices of content management system 108 might facilitate interactions over content objects 106 by the users (e.g., user $102_1$, ..., user $102_N$) from a respective set of user devices (e.g., user device $302_1$, ..., user device $302_N$). A content management system manages a plurality of content objects at least in part by maintaining (e.g., storing, updating, resolving interaction conflicts, etc.) the content objects subject to the various interactions performed over the content objects by users of the content objects at their respective user devices. The content objects (e.g., files, folders, etc.) in content objects 106 are characterized at least in part by a set of object attributes 340 (e.g., content object metadata) stored at storage devices 330. Furthermore, the users are characterized at least in part by a set of user attributes 342 stored in a set of user profiles 332 at storage devices 330.

Further details regarding general approaches to handling object attributes including content object metadata are described in U.S. application Ser. No. 16/553,144 titled "EXTENSIBLE CONTENT OBJECT METADATA", filed on Aug. 27, 2019, which is hereby incorporated by reference in its entirety.

The users access instances of applications at their respective user devices to interact with content objects 106 managed by content management system 108. As shown, the applications can comprise instances of native applications (e.g., native application $304_1$, ..., native application $304_N$) or instances of third-party applications (e.g., application $110_F$, which might be a SaleForce or "F" application; application $110_S$, which might be a Slack or "S" application, etc.). Various information pertaining to integration of such applications with content management system 108 are codified in an app registry 336 stored in storage devices 330. At least some information of app registry 336 comprises instances of application-specific information 346. In some cases, certain portions of the information in app registry 336 might be locally accessible at the user devices by the applications. For example, a first local app registry might be accessible by application $110_F$ and/or native application $304_1$ and/or other applications at user device $302_1$, and a second local app registry might be accessible by application $110_S$ and/or native application $304_N$ and/or other applications at user device $302_N$.

The instances of the applications operating at the user devices send or receive various instances of messages 324 that are received or sent by message processor 312 at content management server 310. In some cases, messages 324 are sent to or received from content management server 310 without human interaction. One class of messages 324 corresponds to application-specific information received at content management system 108 in response to executing application integration operations. For example, instances of application-specific information 346 that correspond to a particular application might be issued by an enterprise and stored in app registry 336 when the application is registered with content management system 108.

According to the herein disclosed techniques, when users interact with content objects 106 at applications operating on the user device, application requests are issued as instances of messages 324 to content management system 108. The application requests are issued to the system to select one or more applications (e.g., remote applications) that are associated in some way (e.g., according to object type) with the content objects. Message processor 312 receives the application requests and forwards them to app selection service 314. App selection service 314 accesses the object attributes 340, application-specific information 346, and/or other information to select applications that are associated with the content objects corresponding to the respective application requests. Based at least in part on the selected applications presented to them, users submit workflow requests as instances of messages 324 to be received by workflow controller 316. Such workflow requests might be issued in the form of API calls that indicate the target remote application, workflow type, subject content object, and/or other information. Workflow controller 316 processes such workflow requests to invoke and execute (e.g., control) workflows at the identified target applications.

Another class of messages 324 corresponds to interaction events that occur during the course of workflow execution at the applications. Interaction events might be such activities as creating, viewing, modifying, or deleting content objects. When such interaction events occur, the mechanisms (e.g., API communications, etc.) established when integrating the applications with content management system 108 are accessed to issue interaction event messages to activity monitor 318 through message processor 312. Sets of event attributes 344 that correspond to the interaction events are stored in a store of event records 334 at storage devices 330. Activity publisher 320 accesses such event attributes in event records 334 to generate activity updates that are published to various applications. As merely one example, when a workflow invoked from application $110_F$ to be performed at application 110s is completed, that event is recorded in event records 334 and an activity update is pushed to application $110_F$ indicating the workflow is complete.

The foregoing discussions include techniques for integrating applications with a content management system 108 (e.g., step 214 of FIG. 2) and examples of related application-specific information 346 stored in an app registry 336, which techniques are disclosed in further detail as follows.

Figure 4:
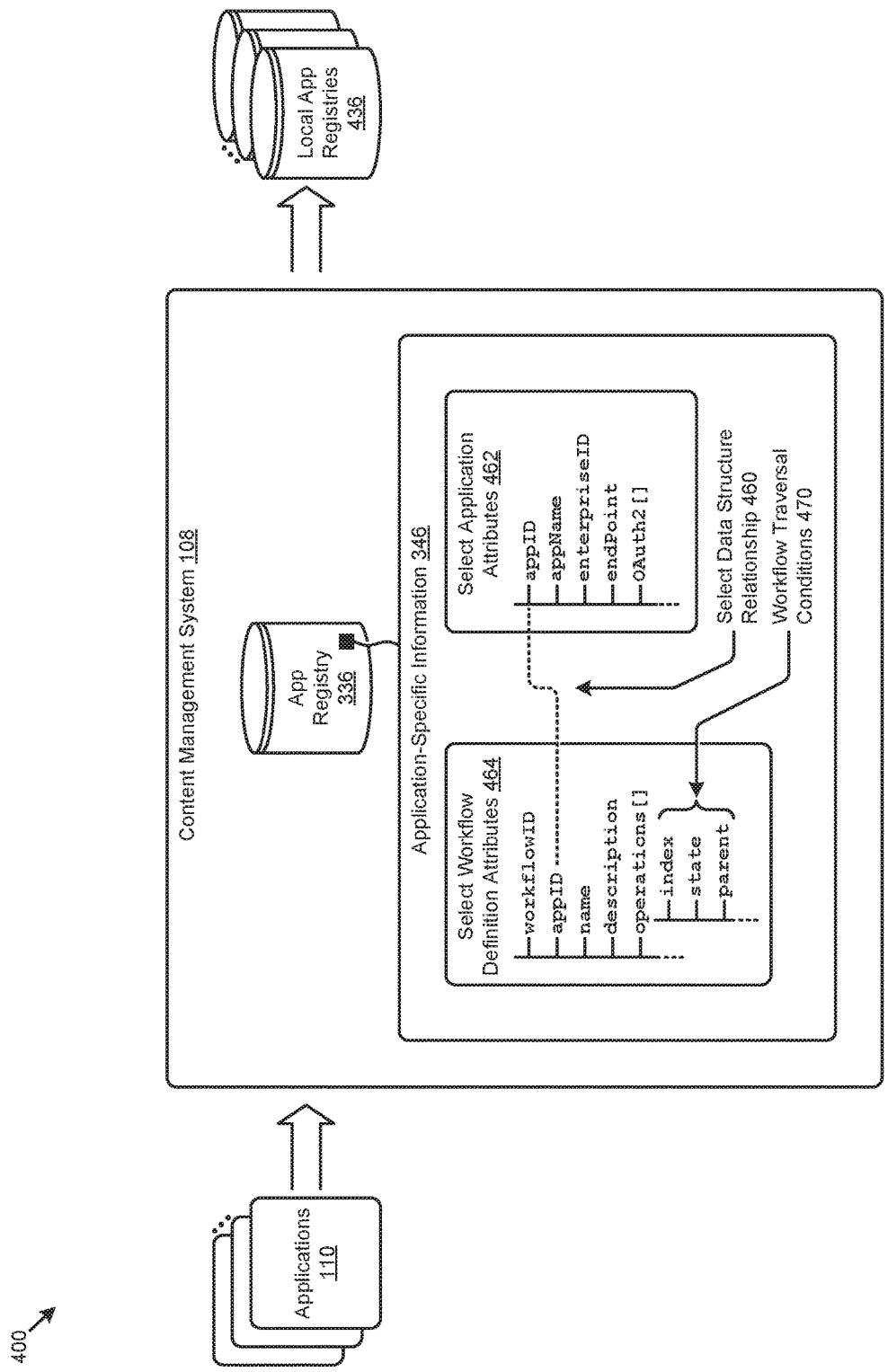
FIG. 4 illustrates an application integration technique as implemented in systems that facilitate access to a dynamically extensible set of content object workflows, according to an embodiment.

FIG. 4 illustrates an application integration technique 400 as implemented in systems that facilitate access to a dynamically extensible set of content object workflows. As an option, one or more variations of application integration technique 400 or any aspect thereof may be implemented in the context of the architecture and functionality of the embodiments described herein. The application integration technique 400 or any aspect thereof may be implemented in any environment.

FIG. 4 illustrates aspects pertaining to accessing a dynamically extensible set of applications through a content management system to perform workflows over content objects managed by the system. Specifically, the figure presents certain specialized data structures for organizing and/or storing certain application-specific information associated with the integration of applications (e.g., third-party applications) with a content management system. The application-specific information associated with the integrations facilitate at least some embodiments of the herein disclosed techniques. Specifically, the specialized data structures associated with the application-specific information are configured to improve the way a computer stores and retrieves certain data in memory when performing the herein disclosed techniques. The application-specific information can be organized and/or stored in accordance with the data structures using various techniques.

For example, the representative data structures associated with application-specific information 346 shown in FIG. 4 indicate that the constituent data of the data structures might be organized and/or stored in a tabular structure (e.g., relational database table) that has rows that relate various attributes with a particular data entity. As another example, the underlying data might be organized and/or stored in a programming code object that has instances corresponding to a particular data entity, and properties corresponding to the various attributes associated with the data entity. A representative instance of a select data structure relationship 460 between certain data entities contained in application-specific information 346 is shown in FIG. 4.

When certain instances of applications 110 are integrated (e.g., registered) with a content management system 108, respective sets of application-specific information 346 are populated in an app registry 336. In some cases, certain portions of the application-specific information 346 are populated in response to various inputs (e.g., selections, entered text, etc.) received from system administrators and/or application developers by interacting with a user interface (e.g., admin and/or developer console). For example, an application developer might first register an application, and a system administrator might later define certain workflows associated with the applications. As shown, some or all of the information from app registry 336 might be replicated to instances of local app registries 436. For example, a local app registry might be stored as a set of metadata associated with a particular application operating at a user device that is remote to the content management system. The metadata of the local app registry can be accessed to facilitate certain herein disclosed techniques (e.g., issuing interaction event messages, etc.).

As indicated in a set of select application attributes 462 in the application-specific information 346, each of the applications 110 that are registered with the content management system is identified by an application identifier (e.g., stored in an "appID" field), an application name (e.g., stored in an "appName" field), an enterprise identifier (e.g., stored in an "enterprise ID" field), an endpoint URL (e.g., stored in an "endpoint" field), a set of OAuth2 credentials (e.g., stored in an "OAuth2[ ]" object), and/or other attributes. As can be observed, the application identifier or "appID" is referenced by other data structures to associate the data underlying those structures with a particular application. Certain attributes (e.g., "enterpriseID", "endpoint", etc.) from select application attributes 462 might be included in interaction event messages from the applications to facilitate identification of the particular instances of the applications that issue the messages.

Various workflows are also defined in the application-specific information 346 in accordance with a set of select workflow definition attributes 464. Specifically, a particular workflow associated with an application identified in an "appID" field is defined by a workflow identifier (e.g., stored in a "workflowID" field), a workflow name (e.g., stored in a "name" field), a workflow description (e.g., stored in a "description" field), a set of operations associated with the workflow (e.g., stored in an "operations[ ]" object), and/or other attributes. As can be observed, each operation of the workflow is described by an operation sequence index (e.g., stored in an "index" field), an operation state description (e.g., stored in a "state" field), a parent operation associated with the operation (e.g., stored in a "parent" field), and/or other attributes. As depicted, the then-current values associated with the "index", "state", and "parent" fields constitute a then-current set of workflow traversal conditions 470 that determine certain actions to be performed in the execution of the workflow. For example, if a then-current instance of the workflow traversal conditions 470 indicates "index=8" and "status=complete", then an action might be taken to move to an operation having a next higher index value (e.g., "index=9").

The foregoing discussions include techniques for selecting applications (e.g., remote applications) from the set of applications integrated with a content management system (e.g., step 222 and step 224 of FIG. 2), which techniques are disclosed in further detail as follows.

Figure 5:
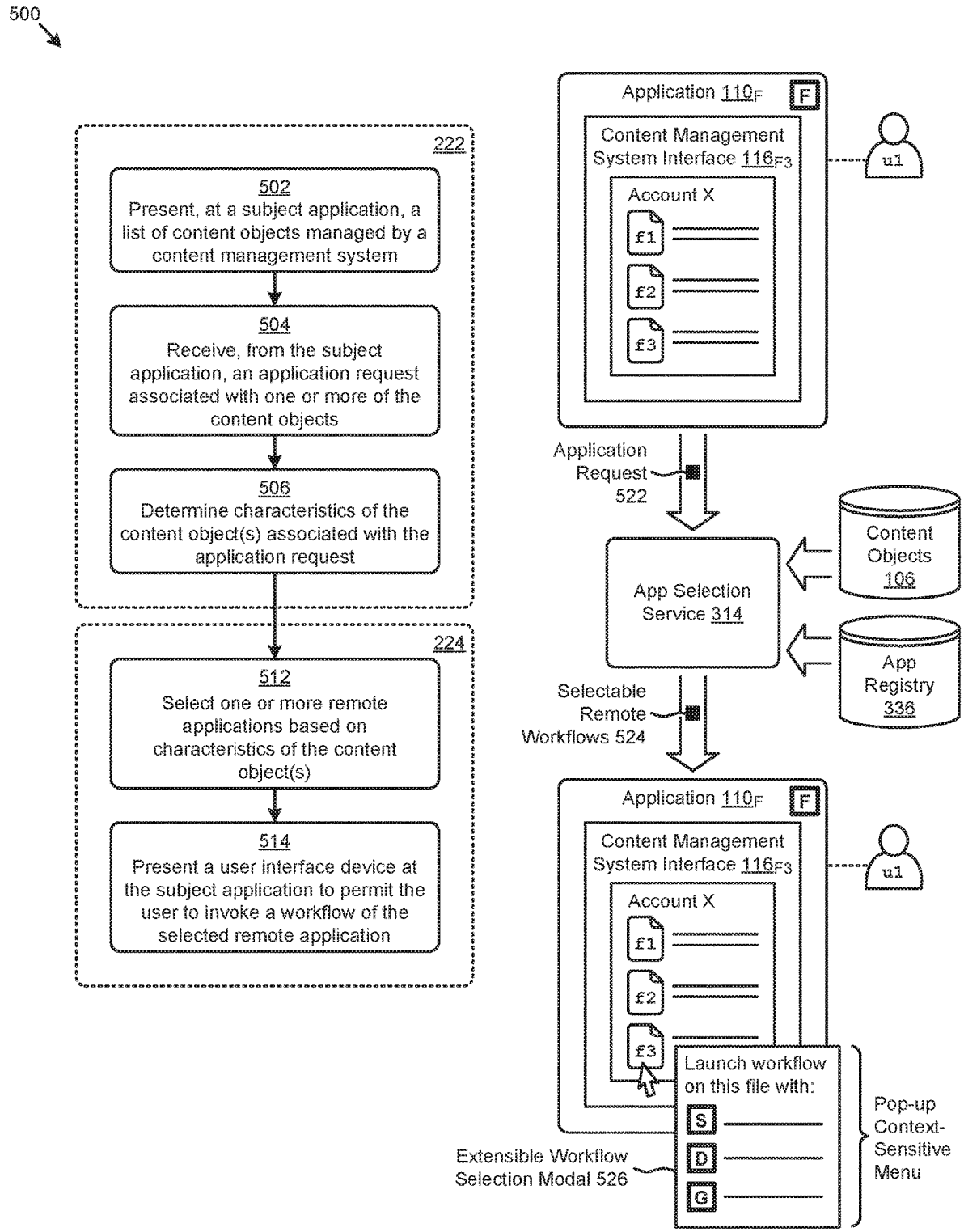
FIG. 5 depicts a remote application identification technique as implemented in systems that facilitate access to a dynamically extensible set of content object workflows, according to an embodiment.

FIG. 5 depicts a remote application identification technique 500 as implemented in systems that facilitate access to a dynamically extensible set of content object workflows. As an option, one or more variations of remote application identification technique 500 or any aspect thereof may be implemented in the context of the architecture and functionality of the embodiments described herein. The remote application identification technique 500 or any aspect thereof may be implemented in any environment.

FIG. 5 illustrates aspects pertaining to accessing a dynamically extensible set of applications through a content management system to perform workflows over content objects managed by the system. Specifically, the figure is presented to illustrate one embodiment of certain steps and/or operations that facilitate selecting one or more remote applications that are associated with a respective set of content objects. As depicted in the figure, the steps and/or operations are associated with step 222 and step 224 of FIG. 2. A representative scenario is also shown in FIG. 5 to illustrate an example application of remote application identification technique 500.

The remote application identification technique 500 commences by presenting at a subject application a list of content objects managed by a content management system (step 502). As shown in the accompanying scenario, a list comprising file "f1", file "f2", and file "f3" is presented to user "u1" in a content management system interface $116_{F3}$ of application $110_F$. In certain embodiments, content management system interface $116_{F3}$ is a user interface embedded as an in-line frame element (e.g., iFrame) in a web page. An application request associated with the content objects is received from the subject application (step 504). As merely one example, when the content management system interface $116_{F3}$ is presented, an application request 522 is issued to an instance of app selection service 314. Application request 522 might comprise information describing the subject application (e.g., application $110_F$), the content objects (e.g., file "f1", file "f2", and file "f3"), and/or other information. The application request is processed to determine the characteristics of the content objects associated with the request (step 506). For example, app selection service 314 might use the object identifiers included in application request 522 to collect information (e.g., object type) about the content objects from the data stored in content objects 106.

Based at least in part on the characteristics of the content objects associated with the application request, a set of one or more remote applications is selected (step 512). To do so, app selection service 314 scans the app registry 336 to identify integrated (e.g., registered) applications that are associated with the content objects presented in content management system interface $116_{F3}$. A set of selectable workflows 524 is included in a message to application $110_F$. The set of selectable workflows may correspond to multiple workflows of a single remote application, or the set of selectable workflows may correspond to multiple workflows across many remote applications.

Responsive to the set of selectable remote workflows, a user interface device is presented at the subject application. The user interface device in turn serves to permit the user to invoke a selected workflow of one of the remote applications (step 514). As shown, the interface device might include an icon and hyperlink (e.g., pointing to an endpoint) for each of the selected applications that can be clicked to invoke one or more workflows at the applications. Such display elements might be presented (e.g., by right-clicking on a content object icon) in an extensible workflow selection modal 526 at content management system interface $116_{F3}$.

Techniques for invoking workflows from such modals or using other mechanisms are disclosed in further detail as follows.

Figure 6:
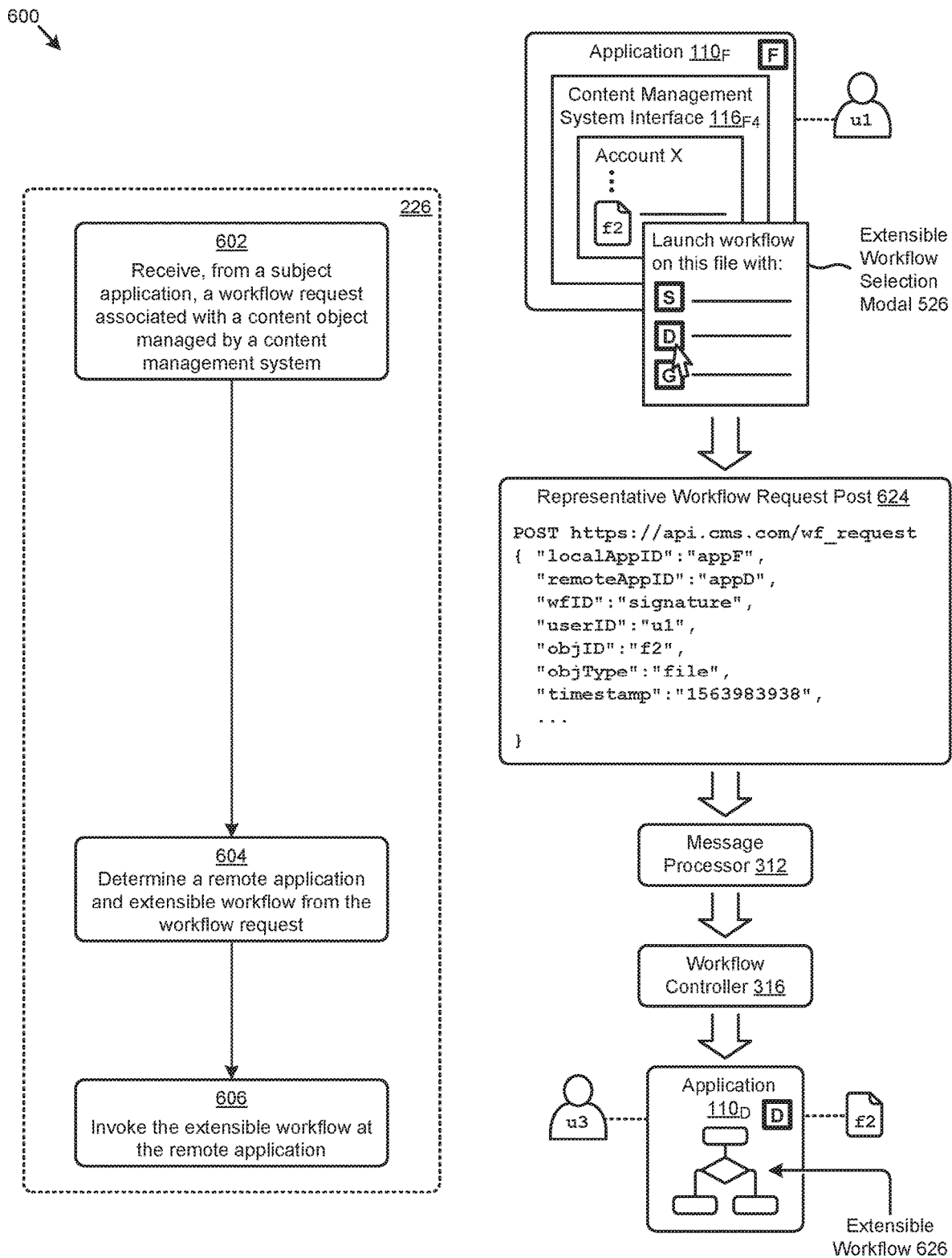
FIG. 6 presents a workflow initiation technique as implemented in systems that facilitate access to a dynamically extensible set of content object workflows, according to an embodiment.

FIG. 6 presents a workflow initiation technique 600 as implemented in systems that facilitate access to a dynamically extensible set of content object workflows. As an option, one or more variations of workflow initiation technique 600 or any aspect thereof may be implemented in the context of the architecture and functionality of the embodiments described herein. The workflow initiation technique 600 or any aspect thereof may be implemented in any environment.

FIG. 6 illustrates aspects pertaining to accessing a dynamically extensible set of applications through a content management system to perform workflows over content objects managed by the system. Specifically, the figure is presented to illustrate one embodiment of certain steps and/or operations that access a content management system to invoke and execute extensible workflows at various applications. As depicted in the figure, the steps and/or operations are associated with step 226 of FIG. 2. A representative scenario is also shown in the figure to illustrate an example application of workflow initiation technique 600.

The workflow initiation technique 600 commences by receiving from a subject application a workflow request associated with a content object managed by a content management system (step 602). As illustrated in the representative scenario, the workflow request might be issued by user "u1" from a content management system interface $116_{F4}$ at application $110_F$. More specifically, the workflow request is invoked by selecting application "D" from an extensible workflow selection modal 526 associated with file "f2" listed in the interface. As can be observed in a representative workflow request post 624, application $110_F$ posts a set of attributes to a "wf_request" API endpoint that describes a request to invoke workflow "signature" over content object (e.g., file) "f2" at remote application "appD".

The workflow request (e.g., API call) is received by message processor 312 and forwarded to workflow controller 316 to determine a remote application and extensible workflow from the workflow request (step 604). For example, the payload of representative workflow request post 624 is parsed by the workflow controller to determine the aforementioned parameters (e.g., "remoteAppID"="appD", "wfID"="signature") and/or other information. Using the parameters extracted from the workflow request, the extensible workflow is invoked at the remote application (step 606). As shown, workflow controller 316 launches an extensible workflow 626 (e.g., "signature" workflow) over file "f 2" at application $110_D$. An alert to user "u3" to interact with the workflow (e.g., as the first or only signatory) may also be issued by workflow controller 316 or by extensible workflow 626.

Further details regarding general approaches to automatically determining a remote application and/or its invokable workflows are described in U.S. application Ser. No. 16/553,161 titled "WORKFLOW SELECTION", filed on Aug. 27, 2019, which is hereby incorporated by reference in its entirety.

The foregoing discussions include techniques for monitoring and recording such interactions with extensible workflows (e.g., step 232 of FIG. 2), which techniques are disclosed in further detail as follows.

Figure 7:
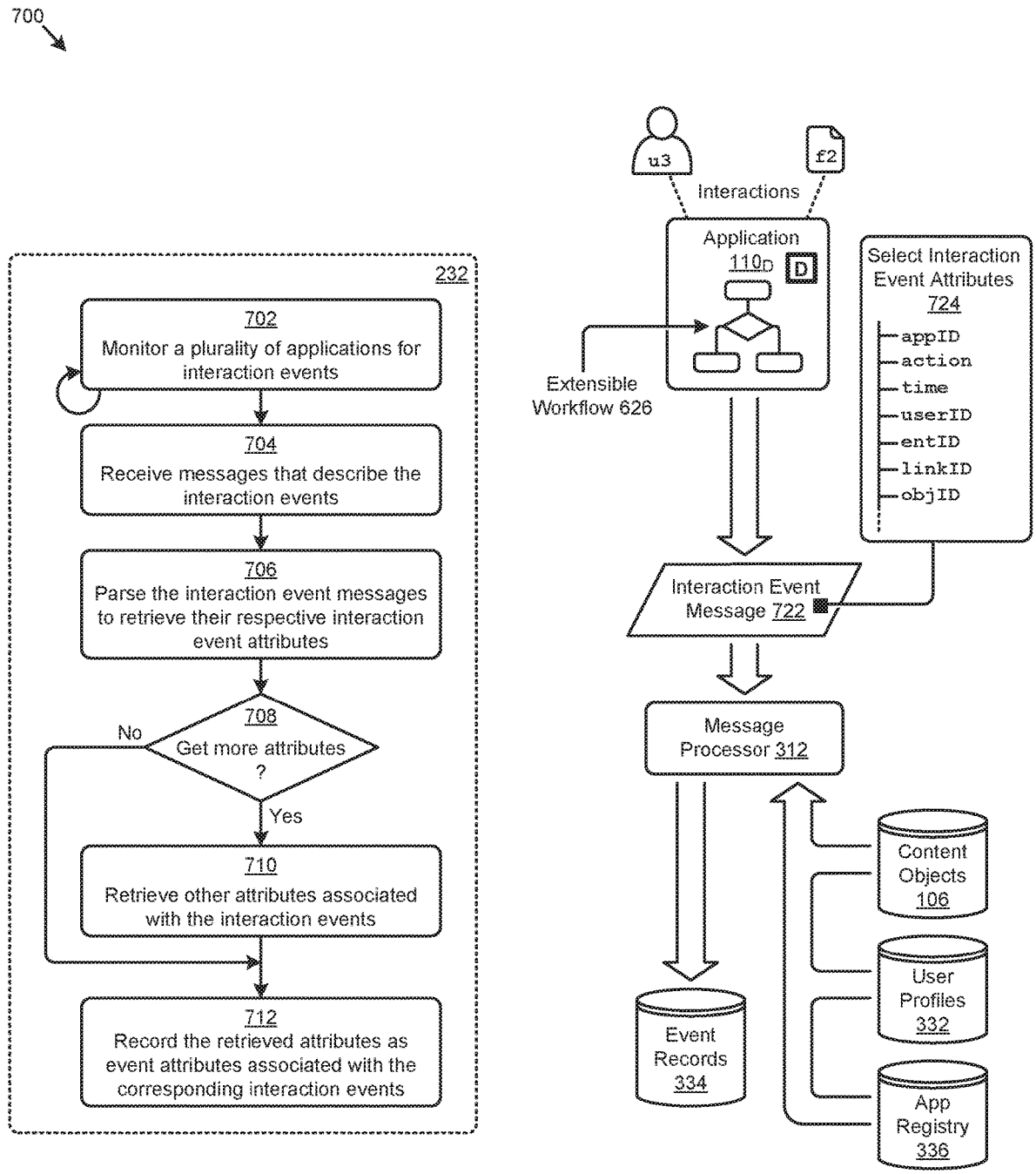
FIG. 7 presents a workflow activity observation technique as implemented in systems that facilitate access to a dynamically extensible set of content object workflows, according to an embodiment.

FIG. 7 presents a workflow activity observation technique 700 as implemented in systems that facilitate access to a dynamically extensible set of content object workflows. As an option, one or more variations of workflow activity observation technique 700 or any aspect thereof may be implemented in the context of the architecture and functionality of the embodiments described herein. The workflow activity observation technique 700 or any aspect thereof may be implemented in any environment.

FIG. 7 illustrates aspects pertaining to accessing a dynamically extensible set of applications through a content management system to perform workflows over content objects managed by the system. Specifically, the figure is presented to illustrate one embodiment of certain steps and/or operations that facilitate recording interaction events performed over content objects at various applications. As depicted in the figure, the steps and/or operations are associated with step 232 of FIG. 2. A representative scenario is also shown in the figure to illustrate an example application of workflow activity observation technique 700.

The workflow activity observation technique 700 commences by monitoring a plurality of applications for interaction events (step 702). As illustrated, an instance of message processor 312 may continuously listen or poll for interaction events performed at a plurality of applications that include the application $110_D$ accessed by user "u3". As can be observed, user "u3" might be interacting with an extensible workflow 626 being executed over file "f2" at application $110_D$. When interaction event messages are received (step 704), the interaction event messages are parsed to retrieve respective sets of interaction event attributes from the messages (step 706). As shown, message processor 312 receives an interaction event message 722 in response to user "u3" interacting with file "f3" at application $110_D$. As indicated by a set of select interaction event attributes 724, the interaction attributes associated with the interaction event messages include an application identifier (e.g., stored in an "app ID" field), an interaction type description (e.g., stored in an "action" field), a timestamp (e.g., stored in a "time" field), a user identifier (e.g., stored in a "userID" field), an enterprise identifier (e.g., stored in an "entID" field), a link identifier (e.g., stored in a "linkID" field), a content object identifier (e.g., stored in an "objID" field), and/or other attributes.

If other attributes are to be considered ("Yes" path of decision 708), then various other attributes associated with the interaction event messages are retrieved (step 710). In this case, message processor 312 might access the datastores of content objects 106, user profiles 332, app registry 336, and/or other data sources to retrieve certain attributes associated with the interaction attributes of the interaction event messages.

All retrieved attributes are then recorded as event attributes associated with the interaction event messages (step 712). As stated, if other attributes are to be considered ("Yes" path of decision 708), the event attributes comprise some or all of the retrieved interaction event attributes and the retrieved other attributes. If merely the interaction event attributes are considered ("No" path of decision 708), the interaction event attributes comprise some or all of the retrieved interaction attributes. In the shown scenario, message processor 312 stores in event records 334 sets of event attributes that correspond to interaction event message 722.

The foregoing discussion includes techniques for publishing the interaction activity (e.g., interaction events) observed at extensible workflows being performed at various applications (e.g., step 234 of FIG. 2), which techniques are disclosed in further detail as follows.

Figure 8:
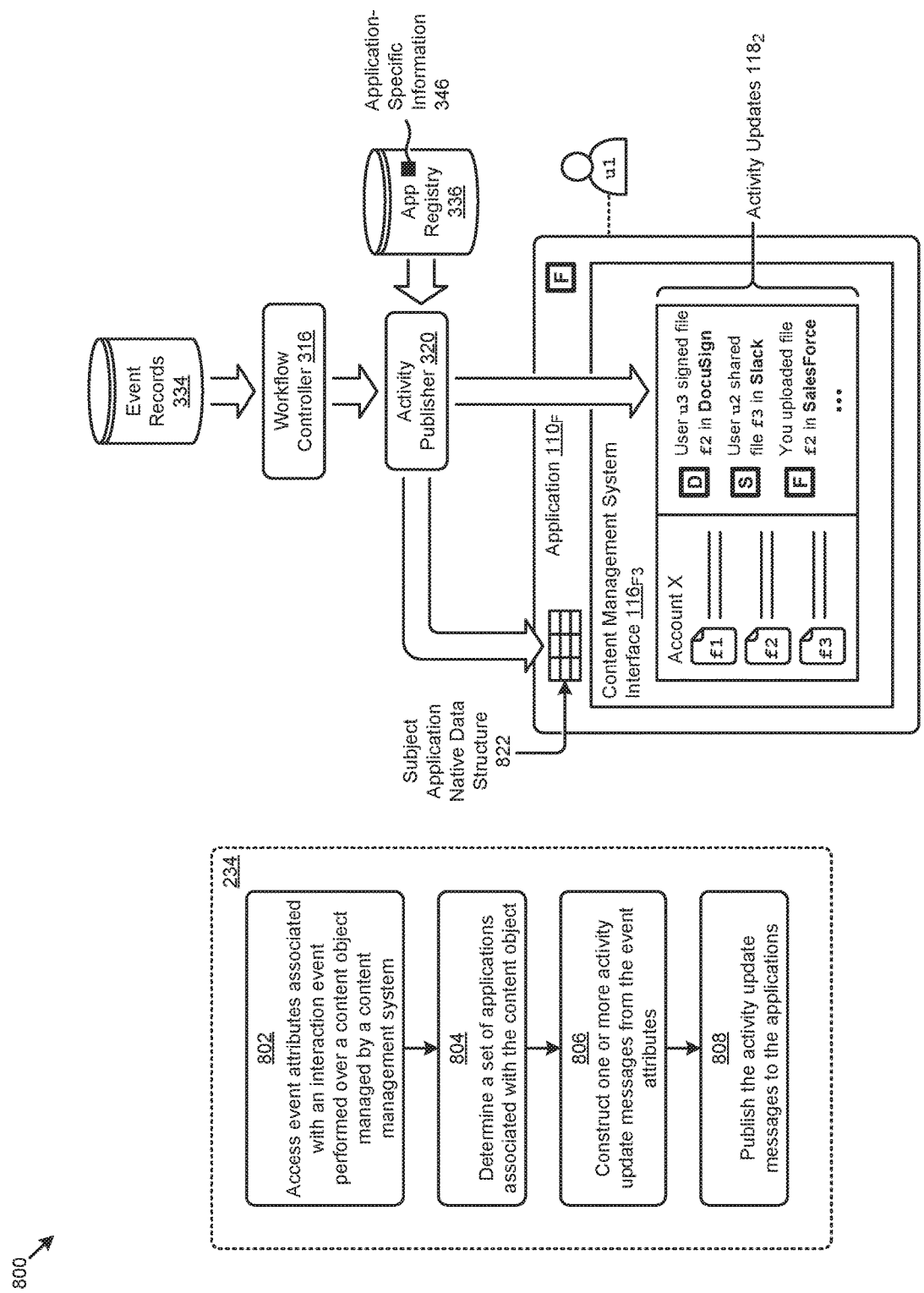
FIG. 8 depicts an activity publication technique as implemented in systems that facilitate access to a dynamically extensible set of content object workflows, according to an embodiment.

FIG. 8 depicts an activity publication technique 800 as implemented in systems that facilitate access to a dynamically extensible set of content object workflows. As an option, one or more variations of activity publication technique 800 or any aspect thereof may be implemented in the context of the architecture and functionality of the embodiments described herein. The activity publication technique 800 or any aspect thereof may be implemented in any environment.

FIG. 8 illustrates aspects pertaining to accessing a dynamically extensible set of applications through a content management system to perform workflows over content objects managed by the system. Specifically, the figure is presented to illustrate one embodiment of certain steps and/or operations that facilitate publishing the interaction activity (e.g., interaction events) observed at extensible workflows being performed at various applications (e.g., remote applications). As depicted in the figure, the steps and/or operations are associated with step 234 of FIG. 2. A representative scenario is also shown in the figure to illustrate an example application of activity publication technique 800.

The activity publication technique 800 commences by accessing event attributes associated with at least one interaction event performed over a content object managed by a content management system (step 802). As illustrated, an instance of workflow controller 316 might retrieve the event attributes from the event records 334 earlier described. Any applications associated with the content object are determined (step 804). Such determination might be performed by an instance of activity publisher 320 based at least in part on a set of event attributes received from workflow controller 316. For example, activity publisher 320 might query the application-specific information 346 in app registry 336 using a content object identifier and/or a content object type and/or other information included in a set of event attributes to enumerate any applications associated with the content object. Workflow controller 316 may also provide information to activity publisher 320 that describes a subject application that initiated the workflow that pertains to the interaction event and content object.

Strictly as one example, the workflow controller 316 might receive event records 334 from a workflow request arising from a first application. The workflow controller 316 might process the request to form one or more messages that are then forwarded to a second target remote application to invoke performance of further workflows. As merely one example, a first user might store a content object in the form of a contract. Then, the same or different user might interact with the contract using the aforementioned SalesForce application (e.g., application $110_F$). From the SalesForce application, the user might decide to invoke a signature workflow over the contract so the contract can be signed via a DocuSign application workflow. In due course (e.g., when a signatory logs in), the workflow controller 316 invokes the signature workflow (e.g., from within the content management system interface $116_{F3}$). If the signing event corresponds to the last signatory, then the signature workflow might send a message to raise an event signaling to the SalesForce application that the last signature has been collected.

This chaining of events, possibly involving one or more round trips between applications, can be carried out between any of a plurality of applications. In the foregoing example, the event signaling that the last signature has been collected might invoke a workflow at the SalesForce application to indicate that the contract has been signed by all parties, which in turn might change the opportunity status corresponding to the contract to "Closed—Won". In some situations, the prior invoked workflow (e.g., to change the opportunity status corresponding to the contract) might trigger invocations of still further workflows.

As pertains to the foregoing example, the acts being carried out by and between the workflows of the applications might raise any number of activity update messages, which messages are constructed from the event attributes associated with the interaction event (step 806). Activity updates corresponding to the interaction events are then published to the set of applications associated with the content object (step 808). As can be observed, an activity update message might comprise human-readable graphical display elements that are presented in a user interface (e.g., as a "feed"). More specifically, activity publisher 320 might publish one or more instances of activity updates 1182 at a content management system interface $116_{F3}$ displayed in application $110_F$ (e.g., the subject application from which the workflow corresponding to the interaction activity was initiated).

Activity publisher 320 might also populate a subject application native data structure 822 associated with application $110_F$ with data that corresponds to the activity updates. For example, such native data structures might be populated with a status flag that can be accessed by the subject application (e.g., application $110_F$) to facilitate various operations performed at the subject application. These data structures can include status indications to facilitate synchronous or asynchronous chaining of acts to be carried out by and between the workflows of the various applications. Strictly as one example, the foregoing data structures might be populated with status flags that serve as shadow copies of statuses of the workflows of the remote applications. The status flags can be consulted periodically and/or upon certain events such that the acts to be carried out by and between the workflows of the various applications can be carried out asynchronously. Activity updates (e.g., activity updates 1182) might include statuses that are then-current as of the time a user logs in to the content management system. Furthermore, in some cases, particular types of activity updates might be highlighted in the user interface so as to alert the user (e.g., the shown user "u1") to take some particular action over a particular shared content object.

ADDITIONAL EMBODIMENTS OF THE DISCLOSURE

Additional Practical Application Examples

Figure 9:
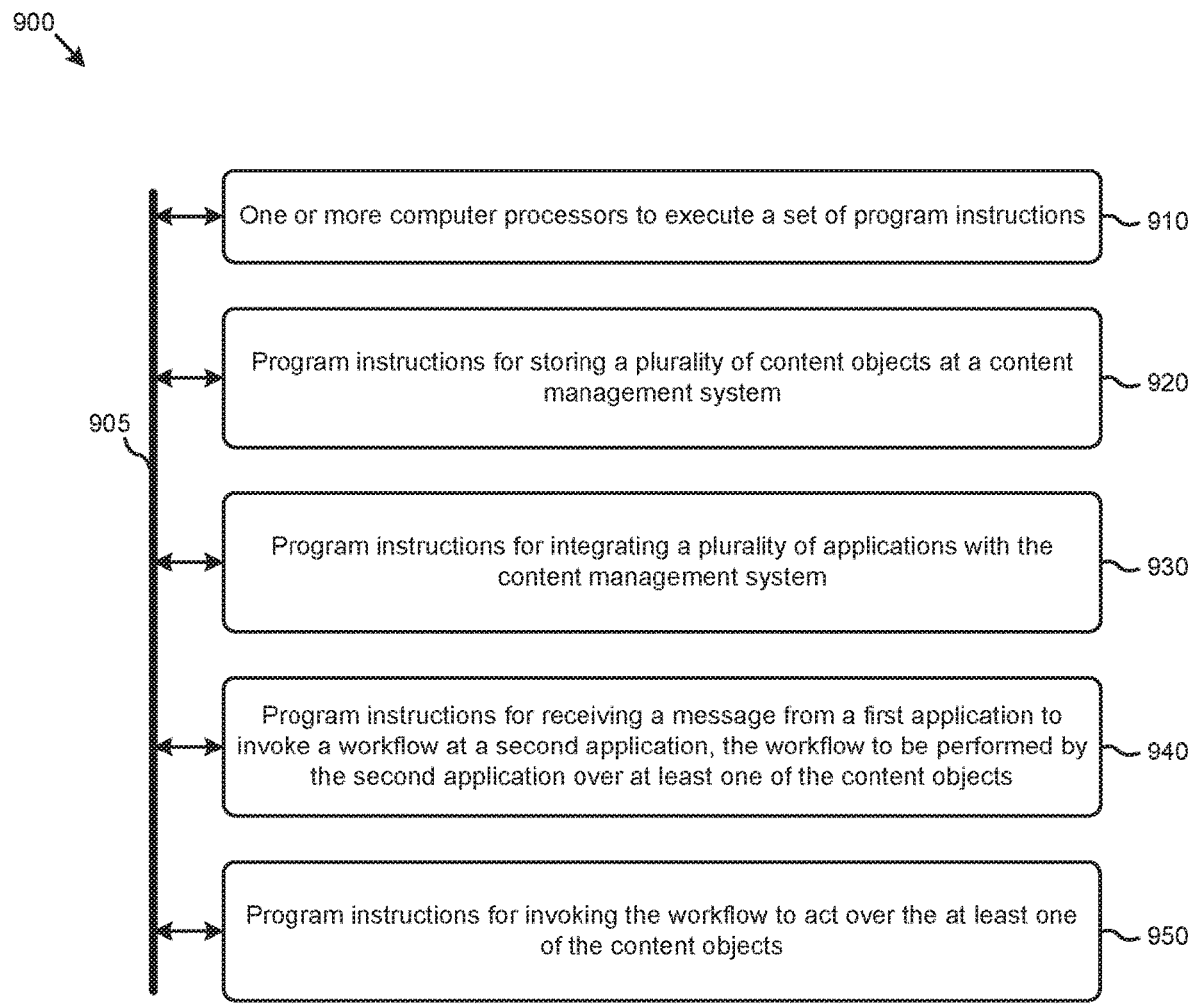
FIG. 9 depicts system components as arrangements of computing modules that are interconnected so as to implement certain of the herein-disclosed embodiments.

FIG. 9 depicts a system 900 as an arrangement of computing modules that are interconnected so as to operate cooperatively to implement certain of the herein-disclosed embodiments. This and other embodiments present particular arrangements of elements that, individually or as combined, serve to form improved technological processes that address content object workflows being limited to those performed at locally integrated applications. The partitioning of system 900 is merely illustrative and other partitions are possible. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with any other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, comprising one or more computer processors to execute a set of program code instructions (module 910) and modules for accessing memory to hold program code instructions to perform: storing a plurality of content objects at a content management system (module 920); integrating a plurality of applications with the content management system (module 930); receiving a message from a first application to invoke a workflow at a second application, the workflow to be performed by a second application over at least one of the content objects (module 940); and invoking the workflow to act over the at least one of the content objects (module 950).

Variations of the foregoing may include more or fewer of the shown modules. Certain variations may perform more or fewer (or different) steps and/or certain variations may use data elements in more, or in fewer, or in different operations.

Still further, some embodiments include variations in the operations performed, and some embodiments include variations of aspects of the data elements used in the operations.

System Architecture Overview

Additional System Architecture Examples

Figure 10A:
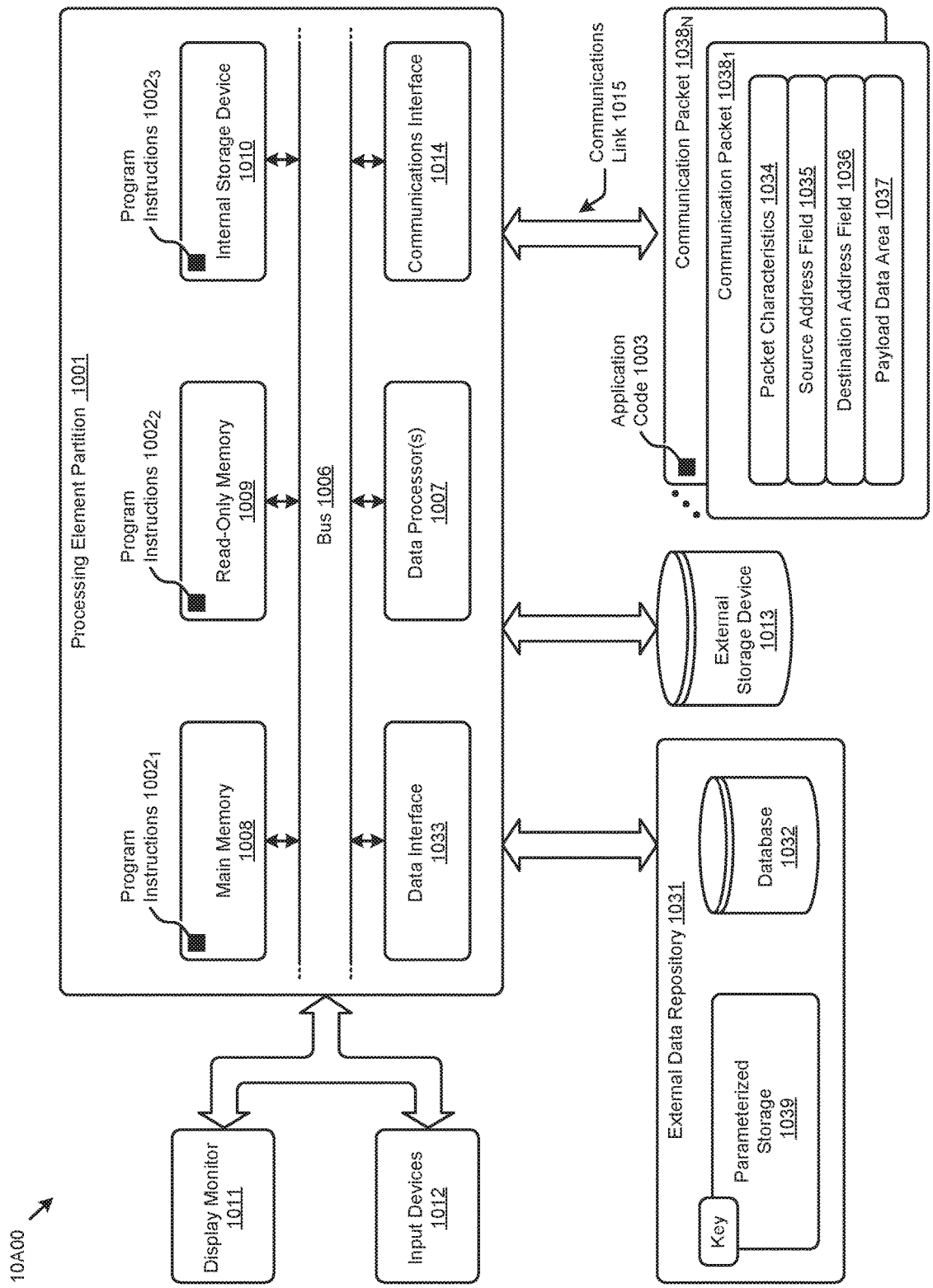
FIG. 10A and FIG. 10B present block diagrams of computer system architectures having components suitable for implementing embodiments of the present disclosure, and/or for use in the herein-described environments.

FIG. 10A depicts a block diagram of an instance of a computer system 10A00 suitable for implementing embodiments of the present disclosure. Computer system 10A00 includes a bus 1006 or other communication mechanism for communicating information. The bus interconnects subsystems and devices such as a central processing unit (CPU), or a multi-core CPU (e.g., data processor 1007), a system memory (e.g., main memory 1008, or an area of random access memory (RAM)), a non-volatile storage device or non-volatile storage area (e.g., read-only memory 1009), an internal storage device 1010 or external storage device 1013 (e.g., magnetic or optical), a data interface 1033, a communications interface 1014 (e.g., PHY, MAC, Ethernet interface, modem, etc.). The aforementioned components are shown within processing element partition 1001, however other partitions are possible. Computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by data processor 1007 executing one or more sequences of one or more program instructions contained in a memory. Such instructions (e.g., program instructions $1002_1$, program instructions $1002_2$, program instructions $1002_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 10A00 performs specific networking operations using one or more instances of communications interface 1014. Instances of communications interface 1014 may comprise one or more networking ports that are configurable (e.g., pertaining to speed, protocol, physical layer characteristics, media access characteristics, etc.) and any particular instance of communications interface 1014 or port thereto can be configured differently from any other particular instance. Portions of a communication protocol can be carried out in whole or in part by any instance of communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as data processor 1007.

Communications link 1015 can be configured to transmit (e.g., send, receive, signal, etc.) any types of communications packets (e.g., communication packet $1038_1$, communication packet $1038_N$) comprising any organization of data items. The data items can comprise a payload data area 1037, a destination address 1036 (e.g., a destination IP address), a source address 1035 (e.g., a source IP address), and can include various encodings or formatting of bit fields to populate packet characteristics 1034. In some cases, the packet characteristics include a version identifier, a packet or payload length, a traffic class, a flow label, etc. In some cases, payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1007 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of a computer system 10A00. According to certain embodiments of the disclosure, two or more instances of computer system 10A00 coupled by a communications link 1015 (e.g., LAN, public switched telephone network, or wireless network) may perform the sequence of instructions required to practice embodiments of the disclosure using two or more instances of components of computer system 10A00.

Computer system 10A00 may transmit and receive messages such as data and/or instructions organized into a data structure (e.g., communications packets). The data structure can include program instructions (e.g., application code 1003), communicated through communications link 1015 and communications interface 1014. Received program instructions may be executed by data processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

Processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1007. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to accessing a dynamically extensible set of content object workflows. A module may include one or more state machines and/or combinational logic used to implement or facilitate the operational and/or performance characteristics pertaining to accessing a dynamically extensible set of content object workflows.

Various implementations of database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of accessing a dynamically extensible set of content object workflows). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations that pertain to accessing a dynamically extensible set of content object workflows, and/or for improving the way data is manipulated when performing computerized operations pertaining to accessing a dynamically extensible set of applications through a content management system to perform workflows over content objects managed by the content management system.

Figure 10B:
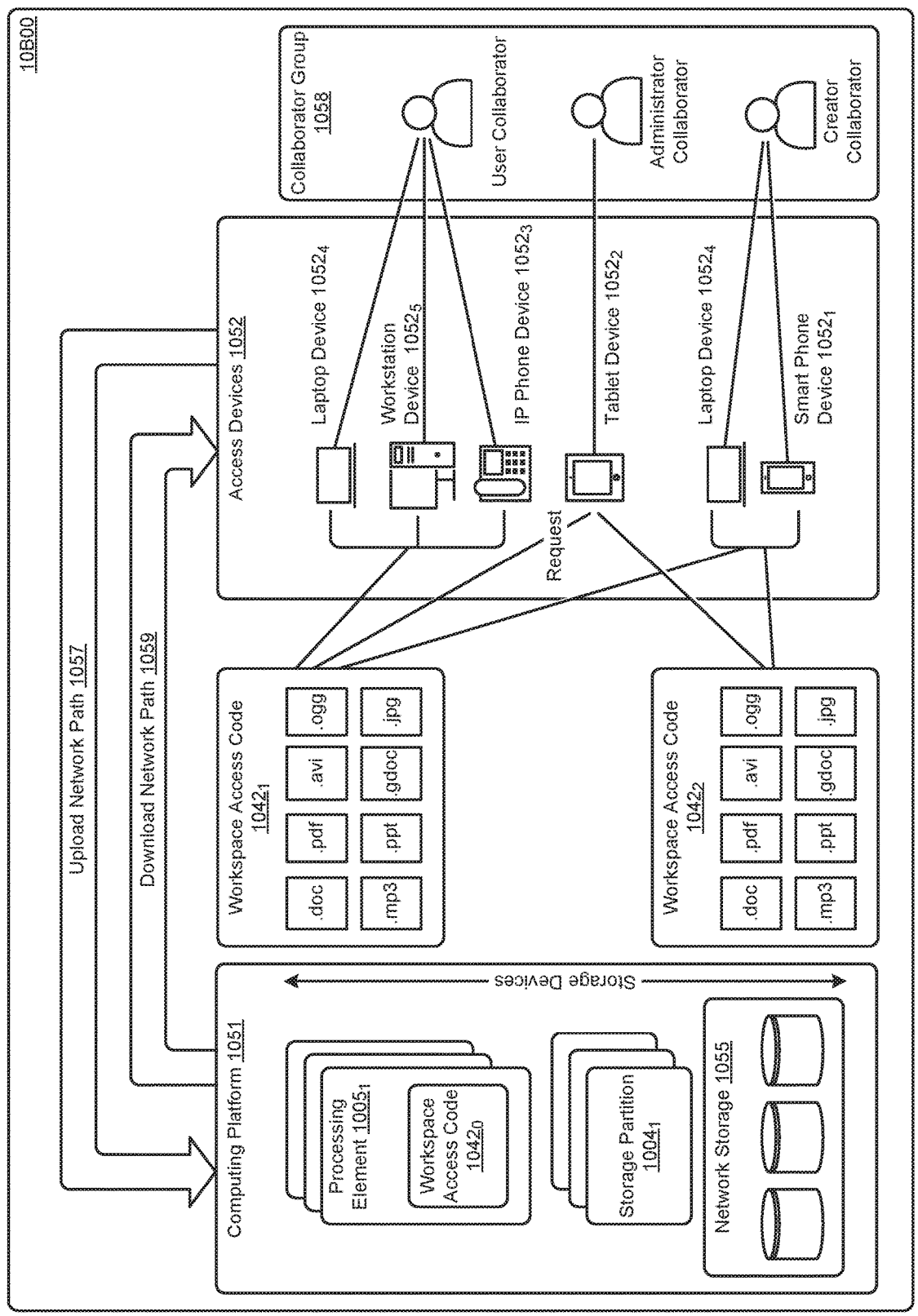

FIG. 10B depicts a block diagram of an instance of a cloud-based environment 10B00. Such a cloud-based environment supports access to workspaces through the execution of workspace access code (e.g., workspace access code 10420, workspace access code 10421, and workspace access code 10422). Workspace access code can be executed on any of access devices 1052 (e.g., laptop device 10524, workstation device 10525, IP phone device 10523, tablet device 10522, smart phone device 10521, etc.), and can be configured to access any type of object. Strictly as examples, such objects can be folders or directories or can be files of any filetype. A group of users can form a collaborator group 1058, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1051, including in a middleware setting. As shown, a portion of the workspace access code resides in and can be executed on one or more processing elements (e.g., processing element $1005_1$). The workspace access code can interface with storage devices such as networked storage 1055. Storage of workspaces and/or any constituent files or objects, and/or any other code or scripts or data can be stored in any one or more storage partitions (e.g., storage partition $1004_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1057). A stored workspace can be delivered to a particular user and/or shared with other particular users via a download (e.g., a download from a processing element to an access device over a download network path 1059).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for extensible workflow access, the method comprising:
   storing a plurality of content objects at a content management system;
   integrating a plurality of applications with the content management system, the plurality of applications comprising at least a first application to perform a first portion of a workflow and a second application to perform a second portion of the workflow;
   receiving a message from the first application to invoke the second portion of the workflow at the second application, the second portion of the workflow to be performed by the second application over at least one of the content objects, and the second application being selected based on a type of the content object; and
   invoking, by the content management system, the second portion of the workflow at the second application, in response to the message from the first application.

2. The method of claim 1, further comprising:
   selecting the second application based at least in part on object attributes associated with the at least one of the content objects.

3. The method of claim 1, further comprising:
   recording at least one interaction event associated with the second portion of the workflow performed at the second application.

4. The method of claim 3, further comprising:
   publishing at least one activity update to the first application, the at least one activity update corresponding to the at least one interaction event.

5. The method of claim 4, wherein the at least one activity update is displayed in at least one user interface associated with the first application or recorded in at least one native data structure associated with the first application.

6. The method of claim 3, wherein the interaction event is described by one or more event attributes, the one or more event attributes comprising at least one of, one or more interaction attributes, one or more object attributes, one or more user attributes, or one or more application attributes.

7. The method of claim 1, wherein the message is generated in response to a user input at a user interface at the first application.

8. The method of claim 7, wherein the user interface comprises at least one of, an in-line frame element, an icon, or a hyperlink.

9. The method of claim 1, wherein the message derives from an API call issued by the first application and received by the content management system.

10. The method of claim 1, wherein the plurality of applications comprises at least one of, a native application, a third-party application, or a remote application.

11. A non-transitory computer readable medium having stored thereon a sequence of instructions which, when stored in memory and executed by a processor causes a set of acts for extensible workflow access, the set of acts comprising:
    storing a plurality of content objects at a content management system;
    integrating a plurality of applications with the content management system, the plurality of applications comprising at least a first application to perform a first portion of a workflow and a second application to perform a second portion of the workflow;
    receiving a message from the first application to invoke the second portion of the workflow at the second application, the second portion of the workflow to be performed by the second application over at least one of the content objects, and the second application being selected based on a type of the content object; and
    invoking, by the content management system, the second portion of the workflow at the second application, in response to the message from the first application.

12. The non-transitory computer readable medium of claim 11, wherein the set of acts further comprise selecting the second application based at least in part on object attributes associated with the at least one of the content objects.

13. The non-transitory computer readable medium of claim 11, wherein the set of acts further comprise recording at least one interaction event associated with the second portion of the workflow performed at the second application.

14. The non-transitory computer readable medium of claim 13, wherein the set of acts further comprise publishing at least one activity update to the first application, the at least one activity update corresponding to the at least one interaction event.

15. The non-transitory computer readable medium of claim 14, wherein the at least one activity update is displayed in at least one user interface associated with the first application or recorded in at least one native data structure associated with the first application.

16. The non-transitory computer readable medium of claim 13, wherein the interaction event is described by one or more event attributes, the one or more event attributes comprising at least one of, one or more interaction attributes, one or more object attributes, one or more user attributes, or one or more application attributes.

17. The non-transitory computer readable medium of claim 11, wherein the message is generated in response to a user input at a user interface at the first application.

18. The non-transitory computer readable medium of claim 17, wherein the user interface comprises at least one of, an in-line frame element, an icon, or a hyperlink.

19. A system for extensible workflow access, the system comprising:
- a storage medium having stored thereon a sequence of instructions; and
- one or more processors that execute the sequence of instructions to cause the one or more processors to perform a set of acts, the set of acts comprising,
  - storing a plurality of content objects at a content management system;
  - integrating a plurality of applications with the content management system, the plurality of applications comprising at least a first application to perform a first portion of a workflow and a second application to perform a second portion of the workflow;
  - receiving a message from the first application to invoke the second portion of the workflow at the second application, the second portion of the workflow to be performed by the second application over at least one of the content objects, and the second application being selected based on a type of the content object; and
  - invoking, by the content management system, the second portion of the workflow at the second application, in response to the message from the first application.

20. The system of claim 19, further comprising selecting the second application based at least in part on object attributes associated with the at least one of the content objects.

* * * * *